Patented Dec. 18, 1928.

1,695,640

UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

CHLORINATED-RUBBER COMPOSITION CONTAINING LINSEED OIL.

No Drawing. Application filed March 22, 1924. Serial No. 701,024.

This invention relates to a composition adapted for use in coating wood, metal or other surfaces and in impregnating fabric, fibrous materials etc. thereby affording protection against moisture and other destructive agencies. This application is in part a continuation of copending applications, Serial 442,245, filed February 3, 1921, and Serial 496,594, filed August 29, 1921.

The invention involves the use of chlorinated rubber, preferably a very highly chlorinated grade, containing 67 per cent or more of combined chlorine, such as that made by subjecting raw rubber to the action of chlorine under superatmospheric pressure. Material of this sort has a much greater solubility, in various organic solvents, than rubber, and dries out readily to a hard film, which does not exhibit tacky properties, whereas raw rubber requires a long time to give up its solvent entirely, and thus remains tacky indefinitely.

The addition of drying oils to solutions of chlorinated rubber in solvents of the benzol type is helpful, since such addition allows the varnish to work more easily under the brush, and hence renders application easier. The combination also has other advantages such as increased resistance to water, increased hardness, flexibility etc. The invention further involves the use of drying oils such as linseed oil which may be added in greater or less proportions to a solution of chlorinated rubber in a volatile solvent such as benzol, toluol, xylol, solvent naphtha, or other suitable solvents. Boiled linseed oil is preferably employed, as the rate of drying is greater, and driers may be added if desired. When a small proportion of linseed oil is used the varnish dries more quickly than the usual type of linseed oil varnish, but unlike many quick-drying compositions, the coating obtained is hard and tough. Larger amounts of the oil may be incorporated with the chlorinated rubber solution, yielding a product resembling long oil varnishes, but of increased elasticity and toughness due to the peculiar properties of the chlorinated rubber. Various resins (such as those commonly used in varnishes) may also be added if desired.

Raw linseed oil, or ordinary boiled oil, yields a coating having a bright, glossy surface. As stated in copending application, Serial 442,245 (now Patent 1,541,693), under certain conditions a dull, or flat, finish may be obtained from varnishes containing linseed oil and chlorinated rubber. For this purpose, linseed oil which has been boiled for an extended period, until a material increase in viscosity has occurred, is useful. The oil may be employed in a minor proportion, one-half to one-fifth of the weight of chlorinated rubber present in the solution being suitable. Larger proportions however may be utilized if desired. While highly chlorinated rubber may be utilized in the production of flatting varnishes, the lower chlorinated grades, containing about 50 per cent combined chlorine give somewhat better results when used with linseed oil.

A suitable formula for coating compositions is as follows:

| | Parts. |
|---|---|
| Highly chlorinated rubber | 20 |
| Boiled linseed oil | 8 |
| Toluol | 60 |
| Japan drier (liquid) | 1 |

The varnish is prepared by dissolving the chlorinated rubber in the toluol, with the aid of heat if desired, and after the solution is complete, adding the linseed oil and drier, agitating the solution during the process. This varnish dries rapidly being dust free in about 30 minutes, yielding a brilliant surface.

Another example of a suitable formula is:

| | Parts. |
|---|---|
| Highly chlorinated rubber | 10 |
| Boiled linseed oil | 10 |
| Toluol | 30 |
| Japan drier (liquid) | 3 |

This also gives a bright, or glossy finish. More dilute or thinner varnishes of this type are also suitable for application over old varnished surfaces which have become dull, thus serving as a varnish reviver, as set forth in copending application Serial 442,245.

Compositions of the sort described above are also of use in impregnating wood, fabric and the like.

Instead of linseed oil, other drying oils such as tung oil, soya bean oil, perilla oil, or menhaden oil may be employed, or mixtures of these oils with each other or with linseed oil may be incorporated with the chlorinated rubber solution.

In the foregoing chlorinated rubber has been referred to, but it is to be understood that the use along with chlorine of bromine or other halogens in making a chlorinated product also having other halogens in combination is not precluded, since within the purview of this invention are included chlorinated rubber products or chlorinated rubber derivatives, which may contain other elements than simply chlorine, carbon and hydrogen, all to such extent as such products function in a manner similar or analogous to true chlorinated rubber. Likewise in place of natural rubber, artificial rubber may be employed in some cases as a basis for halogenation; or gutta percha, balata etc. may be utilized.

What I claim is:—

1. A coating composition comprising a solution of chlorinated rubber in a volatile solvent and linseed oil.

2. A coating composition comprising a solution of chlorinated rubber and a drying oil in a volatile solvent, less of the drying oil being present than chlorinated rubber, such composition yielding a flat or dull finish.

CARLETON ELLIS.